United States Patent Office 3,447,943
Patented June 3, 1969

3,447,943
PROCESS FOR THE WHITENING OF
POLYMERIC MATERIALS
George Harold Keats and Barrie Tinker, Manchester,
England, assignors to Imperial Chemical Industries
Limited, London, England, a corporation of Great
Britain
No Drawing. Filed Aug. 19, 1965, Ser. No. 481,107
Claims priority, application Great Britain, Sept. 2, 1964,
35,981/64
Int. Cl. C09k 1/02
U.S. Cl. 117—33.5                              2 Claims

ABSTRACT OF THE DISCLOSURE

Process for whitening polymeric materials which comprises treating the material at 85° C.–100° C. in a neutral aqueous medium with a heterocyclic compound containing at least one group of the formula

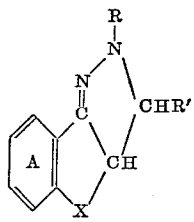

where, among other values, R may be phenyl or substituted phenyl; R' may be hydrogen or phenyl; X may be —$CH_2CH_2$— and the A nucleus may be substituted or unsubstituted.

---

This invention relates to a new process for the whitening of polymeric materials, to new and improved heterocyclic compounds for use in this process, and to the manufacture of such heterocyclic compounds.

According to the invention there is provided a process for the whitening of polymeric materials which comprises incorporating into the polymeric material a heterocyclic compound containing at least one group of the formula:

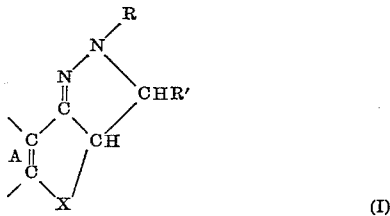

in which A represents an aromatic nucleus which may form part of a larger aromatic system, R represents an aromatic radical, R' respresents hydrogen or an alkyl, aryl or aralkyl radical, and X represents any divalent radical such that the $CH_2$ group of a compound of the Formula II

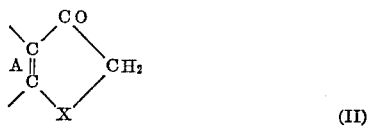

is capable of reacting with an aldehyde to give an ylidene derivative and in which A, R, R' and X are free from chromophoric groups.

The aromatic nucleus represented by A, of which 2 carbon atoms are shown in Formula I, may be homocyclic or heterocyclic. In the case of homocyclic nuclei there come into consideration an unsubstituted benzene nucleus, or a benzene nucleus containing up to four substituents provided that these have little or no tendency to introduce colour into the molecule. Suitable substituents include alkyl groups, alkoxy groups and halogen atoms, for example alkyl and alkoxy groups having up to 4 carbon atoms, and chlorine and bromine. As an example of a heterocyclic system there may be mentioned pyridine. Alternatively the aromatic nucleus A can form part of a larger aromatic system, which may be carbocyclic, for example naphthalene, or heterocyclic, for example quinoline.

The aromatic radical represented by R can be heterocyclic, for example a pyridyl, benzthiazolyl or benzoxazolyl radical, but is preferably a carbocyclic radical such as phenyl or naphthyl. The nucleus or nuclei present in R can be unsubstituted but are preferably substituted but are preferably substituted by one or more non-chromophoric groups, for example alkyl and substituted alkyl groups such as β-hydroxyethyl and β-sulphatoethyl groups, alkenyl groups such as vinyl, or alkoxy, halogen, sulphonic acid, sulphonamide, substituted sulphonamide, cyano, carboxy, ester, carbonamide, sulphone, amino, acylamino and substituted amino groups, including quaternary ammonium groups.

As examples of radicals represented by R' there may be mentioned hydrogen, alkyl, phenyl, substituted phenyl, naphthyl, substituted naphthyl, pyridyl and furyl.

As examples of radicals represented by —X— there may be mentioned:

—$CH_2$—, —$CH_2CH_2$—, —CO—, —O—$CH_2$—, —S—$CH_2$—, —$SO_2CH_2$—, —$CH_2CO$—, —N—$CH_2$ and —N—$CH_2$—
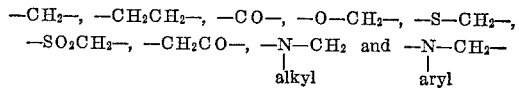

Polymeric materials which can be whitened by the above process include synthetic polymeric materials, for example polyamides such as polyhexamethylene adipamide, polyesters such as polyethylene terephthalate, polyurethanes, polyacrylonitrile and hydrolysed polyacrylonitriles, polymethyl methacrylate, polystyrene, polyethylene and polypropylene, artificial polymers for example secondary cellulose acetate, cellulose triacetate and regenerated cellulose such as viscose, and natural polymers, for example cellulosic materials such as cotton and paper and proteinaceous materials such as silk and wool.

The preferred method of incorporating the heterocyclic compounds into the polymeric materials, particularly when the polymeric material is a synthetic or artificial polymer, is by treating the polymeric material with an aqueous dispersion or solution of the heterocyclic compound. The aqueous dispersion or solution is preferably substantially neutral, or slightly alkaline, acid conditions may be employed if desired but these are not usually so effective. The use of substantially neutral aqueous suspensions or solutions in the process of the invention permits these whitening agents to be applied to textile materials at the same time as dispersed dyestuffs, thus providing dyeings of brighter shade.

The temperature of application in the case of secondary cellulose acetate is desirably about 85° C., since the use of higher temperatures may soften the material, but with the polyamides, cellulose triacetate, acrylonitrile polymers and copolymers and polyesters it is convenient to treat the polymeric material at the boiling point (about 100° C.) of the aqueous suspension. Especially effective whitening of polyesters is obtained under these conditions in contrast to that resulting from use of hitherto described whitening agents which need temperatures above 100°

C. to whiten polyesters effectively and therefore require the use of superatmospheric pressure and consequently special plant.

Surface-active agents, for example fatty alcohol-ethylene oxide condensates or sulphonated alkylnaphthalenes may be added with advantage, and it is in many cases convenient to disperse the heterocyclic compound in a soap or detergent, which is then used simultaneously to wash and whiten the textile material from an aqueous medium. The incorporation of these compounds in soaps or detergents also improves the appearance of the soaps or detergents, and this constitutes a further feature of the inventon.

Th heterocyclic compounds may be used in conjunction with other whitening agents, for example substituted 4:4′ - ditriazinylaminostilbene - 2:2′ - disulphonic acids, in order to increase the whitening effect on certain textile materials, for example when mixtures of textile materials including cotton are being treated.

Other methods of incorporating the heterocyclic compounds in the process of the invention may be used if desired. The heterocyclic compounds may for example be mixed with the polymer in molten or plasticised form.

The compounds of the above Formula I in which R represents a substituted phenyl group are novel and form a further feature of the invention. Above all are preferred the compounds in which R represents a sulphamyl-phenyl group.

The new heterocyclic compounds can be obtained by reaction of a hydrazine of the formula R—NH·NH$_2$ with a compound of the formula:

or with a compound capable of behaving as such, e.g. a compound of the formula:

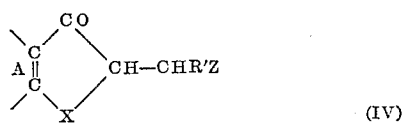

which readily splits off HZ under suitable reaction conditions, Z being for example a hydroxy, amino substituted amino or mercapto group or a chlorine atom. Especially useful are Mannich Bases of structure IV where Z represents substituted amino.

This reaction can conveniently be carried out by heating a solution of the hydrazines and compounds of type IV in the presence of an alkaline catalyst, or a solution of hydrazines and compounds, of type III in the presence of an acid catalyst, a few hours usually sufficing for the reaction to take place. As examples of alkaline catalysts which can be used, there may be mentioned, for example, sodium hydroxide and sodium carbonate. As an example of acid catalysts which can be used there may be mentioned hydrochloric acid.

As examples of hydrazines which can be used, there may be mentioned phenylhydrazine, p-sulphamylphenylhydrazine,
p-chlorophenylhydrazine,
p-(N,N-dimethylaminosulphonyl)phenylhydrazine,
p-(N,N-diethylaminosulphonyl)phenylhydrazine,
p-methoxyphenylhydrazine,
p-cyanophenylhydrazine,
p-carboxyphenylhydrazine,
p-carbethoxyphenylhydrazine,
p-methylsulphonylphenylhydrazine,
phenylhydrazine-p-sulphonic acid,
2-hydrazinopyridine,
2-hydrazinobenzthiazole and 2-hydrazinobenzoxazole.

The compounds of Formula III and IV can be obtained by interaction of a compound of the formula:

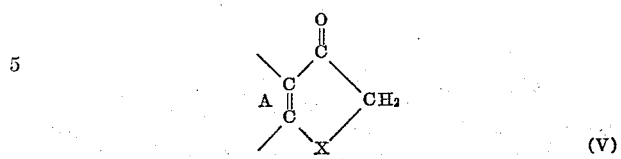

with an aldehyde and, in the appropriate cases, a compound of the Formula HZ.

As examples of compounds of Formula V which can be used for this purpose, there may be mentioned α-tetralone, chroman-4-one, thiochroman-4-one, 1-methyl-4 - oxo - 1,2,3,4-tetrahydroquinoline, indane-1-one and indane-1.3-dione.

As examples of aldehydes which can be used for this purpose, there may be mentioned aliphatic aldehydes, especially formaldehyde or paraformaldehyde, aromatic aldehydes such as benzaldehyde, substituted benzaldehydes, terephthalaldehyde and naphthaldehydes, and heterocyclic aldehydes such as furfuraldehydes and pyridine aldehydes.

As examples of compounds of the formula HZ which can be used, there may be mentioned primary and secondary amines such as dimethylamine, diethylamine, cyclohexylamine, piperidine, morpholine, and benzylamine.

Novel heterocyclic compounds according to the invention may also be obtained by further chemical modification of the substituent group or groups in the benzene ring which, together with the said group or groups, is repersented by R in Formula I. Thus, for example, a novel heterocyclic compound in which R represents a β-hydroxyethanesulphonylphenyl group may be converted in known manner to the potassium salt of the corresponding β-sulphatoethylsulphonylphenyl compound or to the corresponding vinylsulphonylphenyl compound, both of which products are also novel heterocyclic compounds according to the invention.

The invention is illustrated but not limited by the following examples in which parts and percentages are by weight:

EXAMPLE 1

β(dimethylaminomethyl) - α - tetralone hydrochloride [Ref. Mannich, Arch. Pharm. 1937, 275, 54–60] (4.6 parts), p-aminosulphonylphenylhydrazine (4.5 parts), ethanol (20 parts), water (30 parts) and sodium hydroxide (1 part) are stirred together and boiled under reflux for 6 hours. The mixture is then cooled, the yellow solid collected, washed with methanol and dried. It is purified by recrystallisation from chlorobenzene to give pale yellow needles, M.P. 242–243° C.

Analysis gives: C, 62.7%; H, 5.5%; N, 12.6%; ($C_{17}H_{17}N_3O_2S$ requires C, 62.5%; H, 5.2%; N, 12.85%) which agrees with the formula

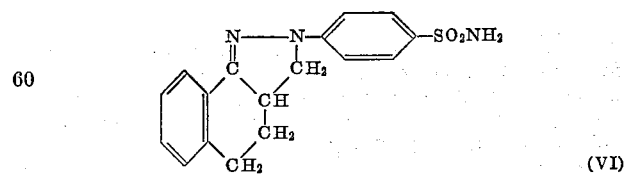

Application to fibres 1 part of the above product is milled with 100 parts of water in the presence of disodium dinaphthylmethane disulphonate (0.1 part) for 48 hours. Pieces, each of 1 part of polyhexamethylene adipamide, cellulose triacetate and polyacrylonitrile fabrics are placed in 200 parts of water, 2 parts of the dispersion prepared as described are added, and the whole is heated at 100° C. for 15 minutes. The treated fabrics appear whiter than the untreated fabrics.

EXAMPLE 2

β(dimethylaminomethyl)-α-tetralone hydrochloride (6 parts) and phenylhydrazine (2.6 parts) in ethanol (26 parts), water (36 parts) and 32% sodium hydroxide solution (3.5 parts) are stirred together and boiled under reflux for 3 hours. The mixture is cooled to 0° C., the yellow solid collected, washed with water and then ethanol and dried to give 4 parts of crude product M.P. 119–123° C. It can be purified by crystallisation from aqueous ethanol to give bright yellowish-green crystals M.P. 125–127° C. The product is the compound of the formula

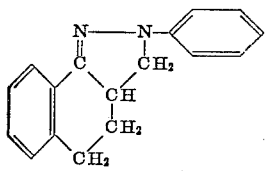
(VII)

The above product can be applied to various fabrics by the method described in Example 1 to give fabrics of a much whiter appearance than the untreated fabric.

EXAMPLE 3

2-(dimethylaminomethyl) - 1 - tetralone hydrochloride (7.2 parts), phenylhydrazine-4-carboxylic acid sulphate (7.8 parts), ethanol (14 parts), water (70 parts) and sodium carbonate (7 parts) are stirred together and boiled under reflux for 3 hours. The mixture is then acidified with concentrated hydrochloric acid and cooled, the solid filtered off and washed acid-free with water. After drying and recrystallising from butanol the pure pale yellow crystals melt at 292° C. (with decomp.)

Analysis gives: C, 73.80%; H, 5.20%; N, 9.6% ($C_{18}H_{16}O_2N_2$ requires C, 74.0%; H, 5.48%; N, 9.60%) which agrees with the formula

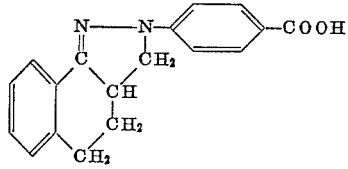
(VIII)

Application to fibres

The above product whitened polyhexamethylene adipamide, cellulose triacetate and polyacrylonitrile fabrics when applied to these in an acetic acid dyebath in a similar manner to that described in Example 1.

EXAMPLE 4

2-benzylidene-1-tetralone [Ref: Shuttleworth and Rapson, J.C.S., 1940, p. 636] (7 parts), p-aminosulphnoylphenylhydrazine (5.7 parts), ethanol (1500 parts), and concentrated hydrochloric acid (36° tw.) (5 parts), are stirred together and boiled under reflux for 24 hours. The violet fluorescing solution is cooled and the product which crystallises out is collected, washed with water and then with methanol and dried, giving 8 parts of cream-coloured solid. Recrystallisation from methanol gives white needles melting at 213° C.–214° C.

Analysis gives: C, 67.9%; H, 5.4%; N, 10.3%; S, 8.0% ($C_{23}H_{21}O_2N_3S$ requires C, 68.3%; H, 5.22%; N, 10.4%; S, 7.94%) which agrees with the formula

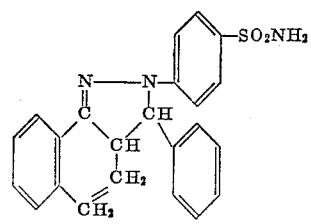
(IX)

Application to fibres

Applied in a similar way to Example 1, this product shows a good whitening effect on polyhexamethylene adipamide, cellulose triacetate and polyacrylonitrile fibres.

EXAMPLE 5

1-tetralone (14.6 parts), 40% formaldehyde (9 parts), ethanol (40 parts), water (18 parts) and sodium hydroxide (0.3 part) are stirred together at room temperature for 4 hours. Water (50 parts) and ammonium sulphate (20 parts) are then added, and the upper layer separated. This layer is treated with ethanol (80 parts), 4-aminosulphonylphenylhydrazine (19 parts) and 35% hydrochloric acid (12 parts) and the mixture refluxed for 24 hours. The mixture is filtered hot and the solid which separates when the filtrate cools is collected. Purification by crystallisation from chlorobenzene and then from 2-ethoxyethanol yields a product of M.P. 242° C., shown by mixed M.P. determination and elementary analysis to be identical with the product from Example 1.

EXAMPLE 6

2-Aluminium chloride (600 parts) are added to γ-butyrolactone (104 parts) in chlorobenzene (1100 parts) and the mixture heated to 80° C. with agitation for 18 hours. After cooling the mixture is poured into ice (3000 parts) and 35% hydrochloric acid (600 parts). The chlorobenzene layer is separated, washed with water, then with sodium hydroxide solution, again with water, dried over calcium chloride and distilled in vacuo. The fraction of B.P. 162–165°/20 mm. (97 parts) is an oil which on cooling to 0° C. partly crystallises. The oil is drained from the crystals, and the latter purified by crystallisation from methanol to give a white product having M.P. 62–65° C.

Analysis gives: C, 65.1%; H, 4.9%; Cl, 19.1% which approximately agrees with the calculated values for x-chloro-1-tetralone, $C_{10}H_9ClO$, viz C, 66.5%; H, 5.0%; Cl, 19.7%.

The x-chloro-1-tetralone so obtained (9 parts) and benzaldehyde (5.6 parts) are stirred together and potassium hydroxide (4 parts) in ethanol (80 parts) added. The mixture is stirred for 4 hours. The solid formed collected, washed with methanol, then with water and purified by crystallisation from ethanol to give cream-coloured needles of 2-benzal-x-chloro-1-tetralone having M.P. 132–134° C.

Analysis gives: C, 75.2%; H, 4.4%; Cl, 13.1%; $C_{17}H_{13}ClO$ requires C, 75.9%; H, 4.85%; Cl, 13.2%.

The 2 - benzal - x - chloro - 1 - tetralone so obtained (41 parts), p - aminosulphonylphenylhydrazine (2.9 parts), ethanol (220 parts) and 35% hydrochloric acid (3.5 parts) are stirred together under reflux for 18 hours. Water (100 parts) is added, and the product which crystallises on cooling is collected, washed with water and dried. It is purified by crystallisation from methanol to give cream-coloured needles having M.P. 222–7° C. after drying in vacuo.

Analysis gives: C, 64.5%; H, 4.6%; N, 8.3%; Cl, 8.8%; S, 6.6%; $C_{23}H_{20}ClN_3O_2S$ requires C, 63.2%; H, 4.6%; N, 9.6%; Cl, 8.1%; S, 7.3% which corresponds with the formula

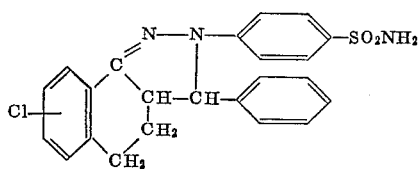

The above product whitens polyhexamethylene adipamide cellulose triacetate and polyacrylonitrile fabrics when applied in an acetic acid dyebath in a similar manner to that described in Example 1.

EXAMPLE 7

2-benzylidene-1-tetralone (7 parts), 4-(methylaminosulphonyl)-phenylhydrazine (6.1 parts), ethanol (200 parts), water (25 parts) and 35% hydrochloric acid (6 parts) are refluxed together for 4 hours. After cooling the solid formed is collected, washed with water and then with methanol, and chystallised from butanol. Yield, 5 parts of product of M.P. 248–249° C.

Analysis gives: C, 68.8%; H, 5.4%; N, 9.7%; S, 7.6%; $C_{24}H_{23}N_3SO_2$ requires C, 69.0%; H, 5.5%; N, 10.1%; S, 7.7% in agreement with the formula

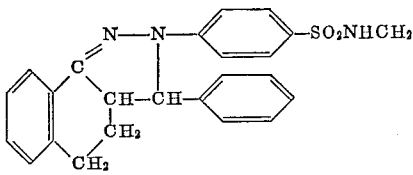

The substance whitens polyhexamethylene adipamide, cellulose acetate, and polyacrylonitrile fibres.

EXAMPLE 8

2-benzylidene-1-tetralone (3.5 parts), 4-(β-hydroxyethylaminosulphonyl)phenylhydrazine half sulphate (4.2 parts) and ethanol (100 parts) are refluxed together with 35% hydrochloric acid (3 parts) for 18 hours. The mixture is diluted with water, cooled, the solid collected and dried and purified by crystallisation from chlorobenzene to give a product having M.P. 193–195° C.

Analysis gives: C, 66.8%; H, 5.7%; N, 9.5%; S, 7.2%; $C_{25}H_{25}N_3O_3S$ requires C, 67.2%; H, 5.6%; N, 9.4%; S 7.2%; in agreement with the formula

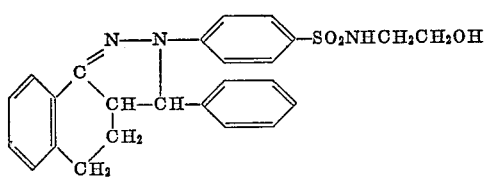

The substance whitens a variety of artificial fibres.

EXAMPLE 9

2-(4-diethylaminobenzylidene)-1-tetralone (Ref. Shriner and Zeeters. J. Amer. Chem. Soc., 60,936) (6.1 parts) and p-chlorophenylhydrazine (2.85 parts) are dissolved in ethanol (100 parts), 35% hydrochloric acid (4.7 parts) added, and the mixture refluxed for 18 hours. The yellow solid which separates on cooling is collected, warmed with dilute sodium hydroxide solution to convert any hydrochloride to free base, and purified by crystallisation from aqueous pyridine or from butanol. The product is obtained as pale yellow needles of M.P. 203–204° C.

Analysis gives: C, 75.3%; H, 6.4%; N, 9.3%; Cl, 8.1%; $C_{27}H_{28}N_3Cl$ requires C, 75.4% H, 6.5%; N, 9.8%; Cl, 8.3% in agreement with the formula

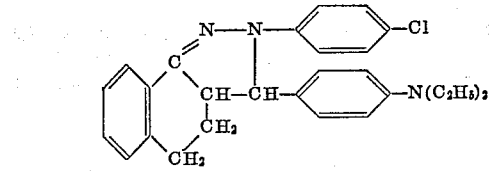

The above product whitens polyhexamethylene adipamide, cellulose acetate and polyacrylonitrile fibres.

EXAMPLE 10

2-(4-methoxynaphthylidene)-1-tetralone (made by reacting 1-tetralone with 1-methoxy-4-naphthaldehyde in presence of caustic potash solution) (4.4 parts), 4-aminosulphonylphenyl-hydrazine (3.0 parts), ethanol (100 parts), water (10 parts) and 35% hydrochloric acid (3 parts) are stirred together under reflux for 18 hours. The product which separates on cooling is collected, washed with water and purified by crystallisation from chlorobenzene, giving 2.5 parts of product having M.P. 227–229° C.

Analysis gives: C, 69.4%; H, 5.3%; N, 8.2%; S, 6.3%; $C_{28}H_{25}N_3O_3S$ requires C, 69.6%; H, 5.2%; N, 8.7%; S, 6.6% in accordance with the formula

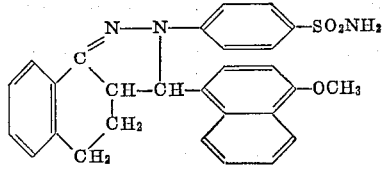

The above whitens polyhexamethylene adipamide and cellulose acetate fibres.

EXAMPLE 11

2-furfurylidene - 1 - tetralone (5.6 parts), 4-(β-hydroxyethylsulphonyl) phenylhydrazine (5.5 parts), ethanol (200 parts) and 35% hydrochloric acid (6 parts) are agitated and refluxed for 12 hours, cooled and the solid obtained collected, washed with water and then with methanol. Purification by crystallisation from 2 - ethoxyethanol gives a product having M.P. 257–258° C.

Analysis gives: C, 64.8%; H, 5.3%; N, 6.5%; S, 7.5%; $C_{23}H_{22}N_2O_4S$ requires C, 65.3%; H, 5.2%; N, 6.6%; S, 7.6% in agreement with the formula

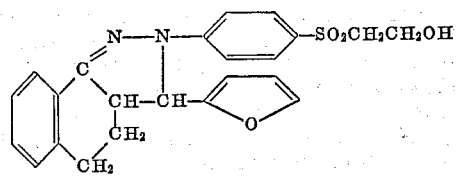

The substance gives a whitening effect on polyhexamethylene adipamide cellulose acetate and polyacrylonitrile.

EXAMPLE 12

2-benzylidene chromanone (3.4 parts), 4-aminosulphonylphenylhydrazine (2.7 parts), ethanol (70 parts) and 35% hydrochloric acid (2.4 parts) are refluxed together for 18 hours. After cooling and dilution with water (100 parts) the solid is collected and purified by crystallisation from butanol (35 parts). The product (1.9 parts) has M.P. 138° C. (decomp.) after drying in vacuo at 100° C.

Analysis gives: C, 64.5%; H, 4.7%; N, 10.4%; S, 8.3%; $C_{22}H_{19}O_3N_3S$ required C, 65.2%; H, 4.7%; N, 10.4%; S, 7.9% in agreement with the formula

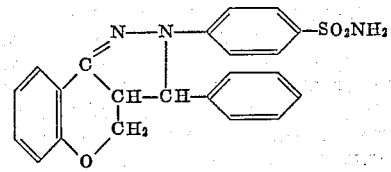

The substance whitens polyhexamethylene adipamide, cellulose acetate and polyacrylonitrile fibres.

EXAMPLE 13

Cyclohexylamine (5.45 parts), paraformaldehyde (1.67 parts) and 1-tetralone (7.3 parts) are stirred together in a nitrogen atmosphere, and 35% hydrochloric acid (5.6 parts) added dropwise. The mixture is heated in a boiling water bath for 1 hour, and then, after cooling somewhat, ethanol (50 parts), water (15 parts), 4-aminosulphonylphenylhydrazine (11.7 parts) and N/1 sodium hydroxide solution (65 parts) are added. The mixture is refluxed for 12 hours, cooled, the solid collected, washed with water and then methanol and dried. The yield of product of M.P. 239-240° C. is 10.9 parts. A mixed M.P. determination shows it to be identical with the product from Example 1, viz:

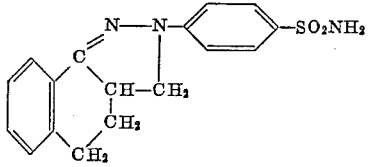

EXAMPLE 14

2-(piperidinomethyl) - 1 - tetralone hydrochloride (2.5 parts) (prepared from 1-tetralone, piperidine hydrochloride and paraformaldehyde), 4-aminosulphonylphenylhydrazine (2.2 parts), ethanol (8 parts), water (3 parts) and N/1 sodium hydroxide (11.7 parts) are stirred and refluxed for 12 hours. The mixture is cooled and the product collected, washed with water and methanol and dried, yielding 1.8 parts of product of M.P. 242-244° C., identical with the product from Example 1.

The preparation may be carried out in a similar way using 2-(morpholinomethyl)-1-tetralone hydrochloride.

EXAMPLE 15

2-(dimethylaminomethyl) - 1 - tetralone hydrochloride (7.5 parts), phenylhydrazine - 4 - sulphonic acid (5.65 parts), water (33 parts) and sodium carbonate (3.3 parts) are stirred under reflux for 6 hours. The mixture is cooled, the yellow solid collected, washed with brine and heated with water (600 parts) to 70° C. The mixture is acidified with hydrochloric acid and the product (6 parts) isolated by addition of sodium chloride (30 parts). It may be purified by recrystallisation from water. It has a M.P. of approx. 232° C.

Analysis of the potassium salt precipitated by addition of potassium acetate to the aqueous solution of the free acid shows it to contain: C, 55.3%; H, 4.2%; N, 7.5%; S, 8.4%; $C_{17}H_{15}N_2O_3SK$ requires C, 55.7%; H, 4.1%; N, 7.7%; S, 8.75% in agreement with the formula

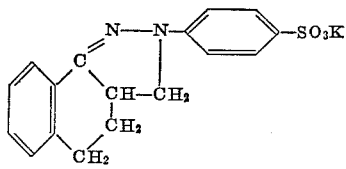

The above product whitens polyhexamethylene adipamide fibres.

EXAMPLE 16

2-(dimethylaminomethyl) - 1 - tetralone hydrochloride (4.6 parts), 4-ethylsulphonylphenylhydrazine (3.9 parts), ethanol (16 parts) and water (5 parts) are stirred together, N/1 sodium hyroxide (25 parts) added and the mixture heated to reflux for 45 minutes. The product separating on cooling is washed with water and then with methanol and is purified by crystallisation from butanol. The pale yellow crystals (2.8 parts) have M.P. 205-206° C.

Analysis gives: C, 66.7%; H, 5.8%; N, 8.3%; S, 9.5%; $C_{19}H_{20}N_2O_2S$ requires C, 67.1%; H, 5.9%; N, 8.25%; S, 9.4% which corresponds with the formula

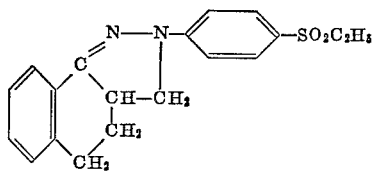

The above product whitens a variety of artificial fibres.

EXAMPLE 17

2-(dimethylphenylaminomethyl) - 1 - tetralone hydrochloride (4.6 parts), 4-(dimethylaminosulphonyl)phenyl hydrazine hydrochloride (6.1 parts), ethanol (16 parts), water (30 parts) and sodium hydroxide (2 parts) are stirred under reflux for 4 hours. The mixture is then cooled, the solid collected, washed with water and then with methanol, and is purified by crystallisation from butanol. It forms pale yellow needles of M.P. 221-222° C. containing C, 63.9%; H, 5.6%; $C_{19}H_{11}N_3O_2S$ requires C, 64.2%; H, 5.9% in agreement with the formula

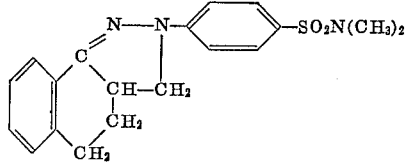

The above product whitens polyhexamethylene adipamide fibres.

EXAMPLE 18

2-(dimethylaminomethyl) - 1 - tetralone hydrochloride (4.6 parts), phenylhydrazine - 4 - sulphonanilide (6.4 parts), ethanol (25 parts), water (5 parts), and N/1 sodium hydroxide solution (25 parts) are stirred together and refluxed for 12 hours. The product separating on cooling is collected, washed with water, dried and purified by crystallisation from butanol to give a cream-coloured solid of M.P. 236-237° C.

Analysis gives: C, 68.0%; H, 4.5%; N, 10.3%; $C_{23}H_{21}N_3O_2S$ requires C, 68.2%; H, 5.2%; N, 10.4% in approximate agreement with the formula

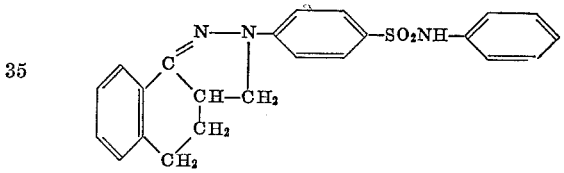

The above product whitens a variety of artificial fibres.

EXAMPLE 19

2-(dimethylaminomethyl) - 1 - tetralone hydrochloride (4.6 parts), 4-(β-hydroxyethanesulphonyl)phenyl hydrazine (4.1 parts), ethanol (16 parts), and water (5 parts) are stirred together, N/1 sodium hydroxide solution (25 parts) added, and the mixture heated to reflux for 4 hours. On cooling the solid is collected, washed with water and then with ethanol and purified by crystallisation from butanol to give 2 parts of pale yellow needles having 207-208° C.

Analysis gives: C, 63.6%; H, 6.0%; N, 8.0%; S, 9.1%; $C_{19}H_{20}O_3N_2S$ requires C, 64.0%; H, 5.6%; N, 7.9%; S, 9.0% in agreement with the formula

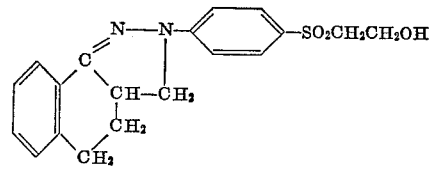

The above product whitens many fibers, including polyhexamethylene adipamide, cellulose acetate, cellulose triacetate and polyacrylonitrile.

EXAMPLE 20

2-(dimethylaminomethyl) - 1 - tetralone hydrochloride (4.6 parts), 2-hydrazino-benzthiazole (3.5 parts), ethanol (30 parts), water (9 parts) and N/1 sodium hydroxide (21 parts) are stirred under reflux for 15 hours, then cooled and the solid formed collected, washed with water and methanol. After crystallisation from butanol the product has M.P. 198-199° C.

Analysis shows: C, 71.0%; H, 4.9%; N, 13.7%; S, 10.6%; $C_{18}H_{15}SN_2$ requires C, 70.0%; H, 4.9%; N, 13.8%; S, 10.5% in agreement with the formula

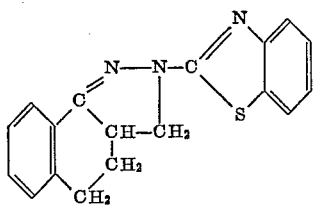

The substance whitens polyhexamethylene adipamide, cellulose acetate and polyacrylonitrile fibres.

EXAMPLE 21

2-dimethylaminomethyl-indane-1-one hydrocloride (5.6 parts), made by the method of Fry (J. Org. Chem. 10, 259–262), p-aminosulphonylphenylhydrazine (5 parts) and glacial acetic acid (50 parts are stirred together and boiled under reflux for 1½ hours. The cooled mixture is filtered and the solid obtained collected and purified by crystallisation from aqueous pyridine. It is a white substance having M.P. 275–277° C. (decomp.).

Analysis gives: C, 61.0%; H, 5.0%; N, 13.2%; S, 10.2%; $C_{16}H_{15}O_2N_3S$ requires C, 61.3%; H, 4.8%; N, 13.4%; S, 10.2% which agrees with the formula

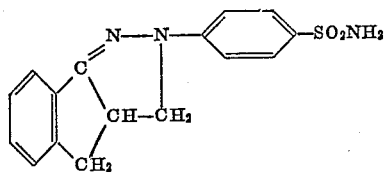

The above product whitens polyhexamethylene adipamide, cellulose triacetate and polyacrylonitrile fabrics when applied in an acetic acid dyebath in a similar manner to that described in Example 1.

EXAMPLE 22

3 - (benzylaminomethyl) - 6-methylthiochromane-4-one hydrochloride (6.4 parts) prepared from 6-methylthiochroman-4-one, benzylamine hydrochloride and paraformaldehyde by the method of Sen (J. Indian Chem. Soc. 1957, 34,687), 4 - (β - hydroxyethylsulphonyl)phenylhydrazine (5.2 parts), ethanol (25 parts), water (5 parts), and N/1 sodiumhydroxide (25 parts) are stirred under reflux for 12 hours. The tarry product solidifies on trituration with water and is washed with methanol, after purification by crystallisation from 2-ethoxyethanol it has M.P. 235–237° C.

Analysis gives: C, 58.8%; H, 5.4%; N, 6.9%; $C_{19}H_{20}O_3N_2S_2$ requires C, 58.7%; H, 5.15%; N, 7.2% in agreement with the formula

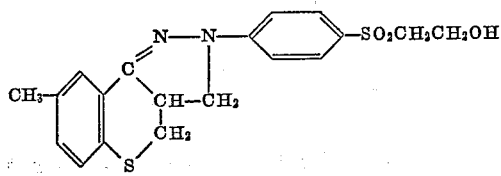

The product gives good whitening effects on polyhexamethylene adiphate, cellulose acetate and polyacrylonitrile fibres.

EXAMPLE 23

3-(benzylaminomethyl)-6-methylthiochroman-4-one hydrochloride (6.4 parts), 4-aminosulphonylphenylhydrazine (4.5 parts), ethanol (25 parts), water (5 parts), and N/1 sodium hydroxide (25 parts) are stirred under reflux for 12 hours. The mixture is then cooled, the solid formed collected and washed with water and then with methanol. After crystallisation from 2-ethoxyethanol it has M.P. 275–277° C.

Analysis gives: C, 56.9%; H, 5.3%; N, 10.8%; $C_{17}H_{17}N_3O_2S_2$ requires C, 57.0%; H, 4.75%; N, 11.7% in approximate agreement with the formula

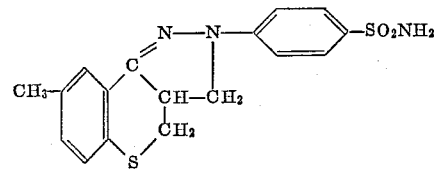

The substance whitens a variety of artificial fibres.

EXAMPLE 24

2 - (4 - β - hydroxyethanesulphonyl)phenyl - 3,3a,4,5-tetrahydrobenz(g)indazole (17.5 parts) is stirred with concentrated sulphuric acid (105 parts) for 15 hours at room temperature. The mixture is poured into iced water (750 parts) and potassium chloride (80 parts) is added to salt out the potassium salt. This is collected, washed with icecold water and dried to give 14 parts of solid having M.P. 267° C. (decomp.).

Analysis gives: C, 48.5%; H, 4.2%; N, 5.9%; S, 11.5%; $C_{19}H_{19}O_6N_2S_2K$ requires C, 48.3%; H, 4.0%; N, 5.9%; S, 11.35% in agreement with the formula

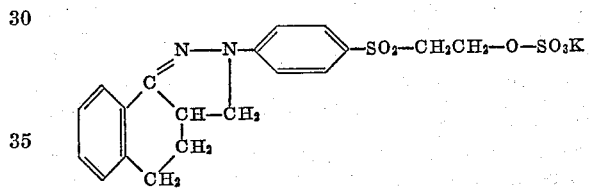

The above product gives good whitening effects on polyhexamethylene adipamide, cellulose acetate and polyacrylonitrile fibres.

EXAMPLE 25

2 - (4 - β - sulphatoethylsulphonyl)phenyl - 3,3a,4,5-tetrahydrobenz(g)indazole (6 parts) is dissolved in water (600 parts) at 80° C., the solution cooled to 30–35° C. and 2 N sodium hydroxide slowly added (approx. 15 parts) until the mixture remains permanently alkaline to Clayton yellow test paper. The mixture is stirred for 1 hour whilst cooling to 20° C., the solid collected and washed alkali-free with water. After drying it may be purified by crystallisation from ethanol, and then has M.P. 175–177° C.

Analysis gives: C, 67.0%; H, 5.7%; N, 8.1%; S, 9.5%; $C_{19}H_{18}N_2O_2S$ requires C, 67.8%; H, 5.3%; N, 8.3%; S, 9.5% in accordance with the formula

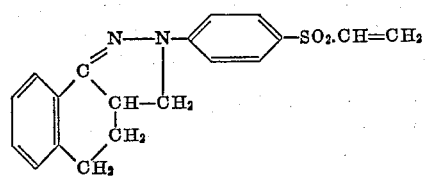

The substance gives good whitening effects on many artificial fibres.

EXAMPLE 26

2 - (4 - carboxyphenyl) - 3,3a,4,5 - tetrahydrobenz(g) indazole (2 parts) (prepared as described in Example 3), methanol (80 parts), chloroform (30 parts) and sulphuric acid (1 part) are refluxed together for 48 hours. The product separating on cooling is collected, washed with hot 10% aqueous sodium carbonate solution and is purified by crystallisation from methanol. It has M.P. 186–187° C.

and contains 9.1% N. $C_{19}H_{17}N_2O_2$ requires 9.2% N, in accordance with the formula

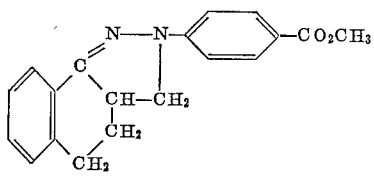

The above product gives good whitening effects on polyhexamethylene adipamide, cellulose acetate, cellulose triacetate and polyacrylonitrile fibres.

What we claim is:

1. A process for the whitening of polymeric materials which comprises treating the polymeric material at a temperature of between 85° C. and 100° C. in a neutral aqueous medium with a heterocyclic compound of the formula

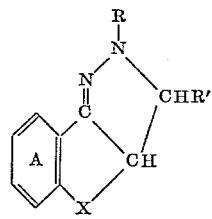

where the nucleus A carries substituents selected from the group consisting of hydrogen, alkyl and alkoxy of up to four carbon atoms and halogen; R is selected from the group consisting of pyridyl, benzthiazolyl, benzoxazolyl, naphthyl, and phenyl and any of these radicals substituted with chlorine, sulphonic acid, sulphonamide, sulphonmethyl-amide, sulphondimethylamide, sulphon-β-hydroxyethylamide, sulphonanilide, ethylsulphonyl, β-hydroxyethylsulphonyl, β-sulphatoethylsulphonyl, vinyl sulphonyl, carboxylic acid, methoxycarbonyl and benzthiazol-2-yl; R' is selected from the group consisting of hydrogen, alkyl, phenyl, diethylamino phenyl, naphthyl, methoxynaphthyl, pyridyl and furyl; and X is selected from the group consisting of —$CH_2$—, —$CH_2CH_2$—, —CO—, —O—$CH_2$—, —S—$CH_2$—, —$SO_2CH_2$—, and —$CH_2CO$—.

2. The process of claim 1 wherein said compound is one where, in the formula, the nucleus A carries substituents selected from the group consisting of hydrogen, chlorine and methyl; R is selected from the group consisting of phenyl and phenyl substituted with at least one member of the group consisting of chlorine, sulphonic acid, sulphonamide, sulphonmethylamide, sulphondimethylamide, sulphon-β-hydroxyethylamide, sulphonanilide, ethylsulphonyl, β-hydroxyethylsulphonyl, β-sulphatoethylsulphonyl, vinyl sulphonyl, carboxylic acid, methoxycarbonyl and benzthiazol-2-yl; R' is selected from the group consisting of hydrogen, phenyl, diethylamino phenyl, methoxynaphthyl and furyl, and X represents a radical selected from the group consisting of —$CH_2$—, —$CH_2CH_2$—, —O—$CH_2$— and —S—$CH_2$—.

References Cited

UNITED STATES PATENTS

| | | |
|---|---|---|
| 2,639,990 | 5/1953 | Kendall et al. |
| 3,048,584 | 8/1962 | Adams et al. |
| 3,063,994 | 11/1962 | Adams et al. |
| 3,234,142 | 2/1966 | Wolfrum et al. |
| 3,255,203 | 6/1966 | Schinzel et al. |

DAVID KLEIN, *Primary Examiner.*

U.S. Cl. X.R.

252—301.2; 260—310